United States Patent
Rosman et al.

(10) Patent No.: US 8,740,151 B1
(45) Date of Patent: Jun. 3, 2014

(54) ADJUSTABLE SPLICE FITTING FOR SHIMLESS CONNECTION OF STRUCTUAL MEMBERS

(75) Inventors: Richard R. Rosman, Seattle, WA (US); Branko Lakic, Kirkland, WA (US); Kenneth Cominsky, Mukilteo, WA (US); Douglas Marciniak, Lake Stevens, WA (US); Steven Edward Pearson, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 408 days.

(21) Appl. No.: 13/342,418

(22) Filed: Jan. 3, 2012

(51) Int. Cl.
*B64C 1/00* (2006.01)

(52) U.S. Cl.
USPC .......................... 244/131; 244/120; 244/119

(58) Field of Classification Search
USPC .................................. 244/131, 120, 119, 132
See application file for complete search history.

(56) References Cited

U.S. PATENT DOCUMENTS

| | | | |
|---|---|---|---|
| 5,201,831 A * | 4/1993 | Higgins et al. | 244/119 |
| 5,518,208 A | 5/1996 | Roseburg | |
| 7,823,362 B2 | 11/2010 | Meyer | |
| 8,061,035 B2 * | 11/2011 | Stulc et al. | 29/897.2 |
| 8,371,528 B2 * | 2/2013 | Paul et al. | 244/119 |
| 2006/0261215 A1 * | 11/2006 | Schimmler et al. | 244/117 R |
| 2009/0294588 A1 * | 12/2009 | Griess et al. | 244/121 |
| 2012/0153082 A1 * | 6/2012 | Rosman et al. | 244/120 |
| 2012/0211602 A1 * | 8/2012 | Dugerie et al. | 244/119 |

* cited by examiner

*Primary Examiner* — Christopher P Ellis (57) ABSTRACT

A fuselage section may include a structural member and a frame member having a stub frame extending over the structural member. The stub frame may have a web. The fuselage section may include an intercostal extending from a terminal end of the stub frame and having an end flange. The fuselage section may additionally include an adjustable splice fitting having a web, a lower flange, and an end flange being mountable in faying contact with respective ones of the stub frame web, the structural member, and the intercostal end flange.

20 Claims, 11 Drawing Sheets

ADJUSTABLE SPLICE FITTING FOR SHIMLESS CONNECTION OF STRUCTURAL MEMBERS

FIELD

The present disclosure relates generally to mechanical joints and, more particularly, to methods for interconnecting two or more structural components.

BACKGROUND

An airframe of an aircraft typically includes a variety of structural elements and structural subassemblies. Individual subassemblies may be separately fabricated in parallel with one another. The completed subassemblies may be assembled to form the airframe. During assembly, the subassemblies may be brought together and aligned with one another. The mating surfaces of the subassemblies may be interconnected to one another using mechanical fasteners.

When individual subassemblies are manufactured by the same manufacturer in the same general location or facility, the individual subassemblies can be closely monitored during fabrication such that adjustments can be made to ensure that the subassemblies will align with one another when assembled without excessive gaps between the mating surfaces. In this regard, subassemblies that are manufactured in the same facility may be formed using commonly-designed or commonly-manufactured tooling to ensure alignment of the mating surfaces without excessive gaps.

However, when subassemblies are manufactured in separate facilities or at different locations using separately-designed and/or separately-manufactured tooling, the mating surfaces may not fit up to one another without the occurrence of gaps between the mating surfaces. Where gaps occur, shimming may be required to fill such gaps prior to joining the subassemblies using mechanical fasteners. Unfortunately, the shimming of gaps between mating surfaces is a time-consuming process that requires measuring the thickness of each gap and the length and width dimensions of the shim required to fill the gap. Each shim must then be fabricated such as by machining or forming the shim in a manner such that the completed shim matches the required shim dimensions.

Occasionally, contoured shims must be fabricated for locations where the gap between two surfaces varies at different locations within the gap. The contoured shim must be fabricated in the required thicknesses at each location of the shim. The shim must also be formed with the required length and width dimensions to match the gap wherein the shim will be installed. The shim may additionally be subjected to inspection and buyoff. The shim must then be installed during fastener installation which may add complexity to the fastener installation process. For the mating of subassemblies having a variety of mating surfaces, the process of measuring the gap thicknesses and the length and width dimensions for each shim, fabricating the shim, inspecting the shim, and then installing the shim may be repeated numerous times. For a large airframe having multiple subassemblies and structural elements that must mate with one another, the process of shim fabrication and installation can significantly add to the production flow time.

As can be seen, there exists a need in the art for a system and method for joining structural elements or subassemblies without the need for shimming between the mating surfaces of the structural elements or subassemblies.

BRIEF SUMMARY

The above-noted needs associated with joining structural elements without shimming are addressed and alleviated by the present disclosure which, in an embodiment, provides a fuselage section which may include a structural member and a fuselage skin. The fuselage may additionally include a frame member having a vertical frame and a stub frame. The vertical frame may be coupled to the skin. The stub frame may extend laterally inwardly from the vertical frame and may extend over the structural member in non-contacting relation to the structural member. The stub frame may have an upper flange and a web. The fuselage may include an intercostal extending laterally inwardly from the stub frame and which may be mounted to the structural member. The intercostal may have an upper flange and a web having an end flange. The fuselage may further include an adjustable splice fitting interconnecting the stub frame to the structural member and to the intercostal. The adjustable splice fitting may have a web, a lower flange and an end flange which may be mountable in faying contact with respective ones of the frame member web, the structural member, and the intercostal end flange.

Also disclosed is a fuselage section having a frame member including a vertical frame and a stub frame. The vertical frame may be coupled to the skin. The stub frame may extend laterally inwardly from the vertical frame over the structural member. The stub frame may have an upper flange and a web. The fuselage may include an intercostal extending laterally inwardly from the stub frame and which may be mounted to the structural member. The intercostal may have an upper flange and a web having an end flange. The fuselage may further include an adjustable splice fitting interconnecting the stub frame to the structural member and to the intercostal. The adjustable splice fitting may have a lower flange and an end flange. The end flange may be mountable in faying contact with respective ones of the frame member web, the structural member, and the intercostal end flange. The fuselage may further include an upper chord splice fitting interconnecting the upper flange of the stub frame and the intercostal, and a lower chord splice strap mounted to a lower side of the structural member and interconnecting the lower flanges of the adjustable splice fitting and the intercostal.

Also disclosed is method of a assembling an aircraft. The method may include the step of providing a fuselage section including a structural member and a fuselage skin. The method may further include attaching the skin to a vertical frame having a stub frame extending inwardly therefrom. The stub frame may have an upper flange and a web. In addition, the method may include mounting an intercostal to the structural member such that a terminal end of the intercostal is positioned adjacent to a terminal end of the stub frame, the intercostal having an upper flange and a web having an end flange. The stub frame may be connected to the structural member and to the intercostal using an adjustable splice fitting. The method may include adjusting the position of the adjustable splice fitting such that a web, a lower flange, and an end flange of the adjustable splice fitting are placed in faying contact with respective ones of the frame member web, the structural member, and the intercostal end flange.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein.

DETAILED DESCRIPTION

Figure 1:
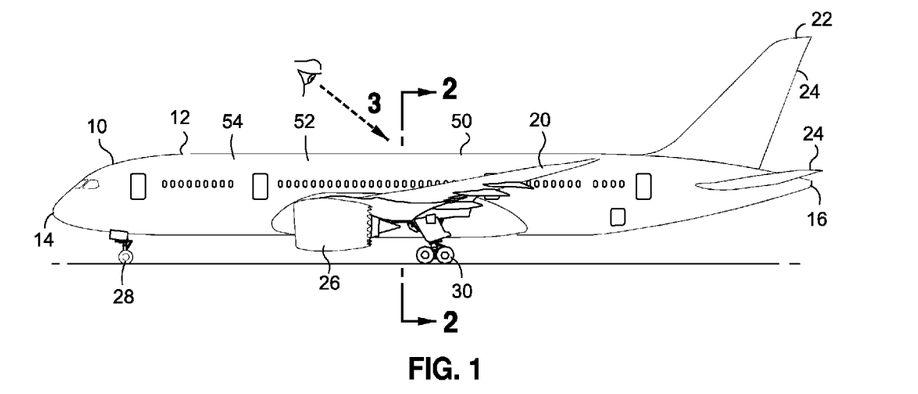
FIG. 1 is a side view of an aircraft having a nose landing gear and main landing gear.

Referring now to the drawings wherein the showings are for purposes of illustrating various embodiments of the present disclosure, shown in FIG. 1 is a side view of an aircraft 10 having a fuselage 12. The fuselage 12 may include a cabin 54 for housing passengers and a flight crew. The fuselage 12 may extend from a nose at a forward end 14 of the aircraft 10 to an empennage 22 at an aft end 16 of the fuselage 12. The empennage 22 may include one or more tail surfaces 24 for directional control of the aircraft 10. The aircraft 10 may further include a pair of wings 20, one or more propulsion units 26, and nose and main landing gear 28, 30. In FIG. 1, the landing gear 28, 30 are shown extended out of the aircraft 10. During flight, the landing gear 28, 30 may be retracted (not shown) inside one or more wheel wells 34 (FIG. 2) formed in the fuselage 12.

It should be noted that although the present disclosure is described in the context of a fixed wing passenger aircraft 10 such as the tube-and-wing aircraft 10 illustrated in FIG. 1, it is contemplated that any one of the various embodiments of the present disclosure may be applied to any aircraft of any configuration, without limitation. For example, the disclosed embodiments may be applied to any civil, commercial, or military aircraft and including fixed-wing aircraft and rotary-wing aircraft. In addition, the embodiments disclosed herein may be applied to alternative aircraft configurations and are not limited to the tube-and-wing aircraft 10 configuration illustrated in FIG. 1. For example, the disclosed embodiments may be applied to hybrid wing-body aircraft.

Figure 2:
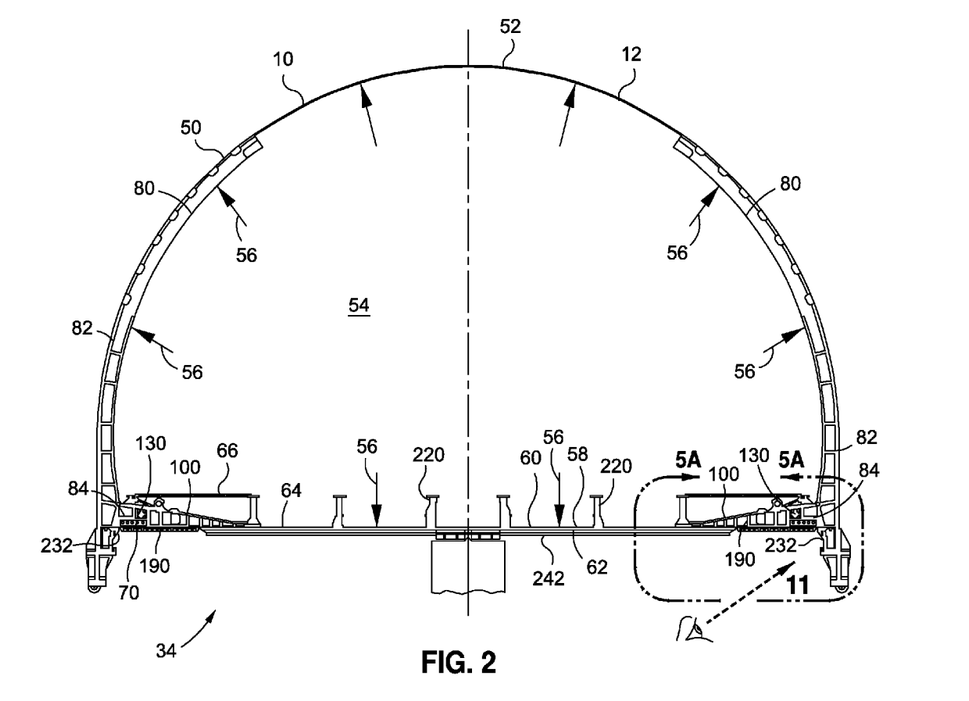
FIG. 2 is a cross-sectional view of a fuselage of the aircraft taken along line 2 of FIG. 1 and illustrating a pressure deck defining a wheel well in the fuselage for housing the main landing gear.

Referring to FIG. 2, shown is the fuselage 12 at the location of the wheel well 34 and illustrating a structural member 68 configured as a pressure deck 64. The pressure deck 64 may be configured as a substantially planar member 58 defining an upper boundary of the wheel well 34. However, the structural member 68 is not limited to a substantially planar pressure deck 64 configuration. In this regard, the structural member 68 may be provided in any size, shape, and configuration, without limitation, including non-planar configurations. The pressure deck 64 may define a lower boundary of an aircraft cabin 54 with regard to an internal pressurization load 56 to which the cabin 54 may be subjected. The internal pressurization load 56 may be applied to the aircraft cabin 54 and represents internal pressurization of the cabin 54 at altitude. Regulatory bodies such as the Federal Aviation Administration (FAA) may require that cabin pressure is maintained at a given pressure altitude (e.g., 8,000 feet or less pressure altitude) when the aircraft 10 is at a cruising altitude (e.g., 35,000 feet). The internal pressurization load 56 may exert an outward force on the fuselage skin 52 and a downward force on the pressure deck 64 as shown.

In FIG. 2, the fuselage skin 52 and the pressure deck 64 may be supported by one or more frame members 80 mounted on opposite sides of the fuselage 12 at the wheel well 34. Each one of the frame members 80 may comprise a stub frame 84 extending laterally inwardly from a vertical frame 82. The vertical frame 82 may be coupled to the skin 52. Each one of the vertical frames 82 and stub frame 84 provide support to the fuselage skin 52 and the pressure deck 64 against the internal pressurization load 56 urging the fuselage skin 52 radially outwardly and urging the pressure deck 64 downwardly. In this regard, each one of the frame members 80 may be sized and configured to resist a relatively large bending moment that may occur at the junction of the stub frame 84 to the vertical frame 82 as a result of the internal pressurization load 56. The bending moment at the junction of the stub frame 84 and vertical frame 82 may also occur a result of flight loads such as wing 20 (FIG. 1) bending loads transmitted into a wing box structure (not shown) that may be located in the fuselage 12 adjacent to the wheel well 34.

The stub frames 84 may be interconnected to a corresponding plurality of intercostals 100. The intercostals 100 may be mounted to the upper surface or side 60 of the pressure deck 64. The intercostals 100 may extend laterally inwardly from the stub frames 84 and may be oriented generally transverse to a longitudinal axis 18 (FIG. 3) of the aircraft 10. However, the stub frames 84 and the intercostals 100 may be oriented at any angle relative to the longitudinal axis 18 and are not limited to a transverse or perpendicular orientation shown in the Figures. The interior portions of the pressure deck 64 may include a plurality of longitudinally-oriented beams mounted to an upper side 60 of the pressure deck 64 for supporting the pressure deck 64 against bending due to the internal pressurization load 56 and for supporting a floor panel 66 of the passenger cabin 54. For example, a plurality of beam segments 190 and/or a plurality of continuous beams 220 may be mounted to the pressure deck 64 as shown in FIG. 2 for resisting bending under the internal pressurization load 56 of the aircraft cabin 54 and for supporting the floor panel 66 of the aircraft cabin 54.

Figure 3:
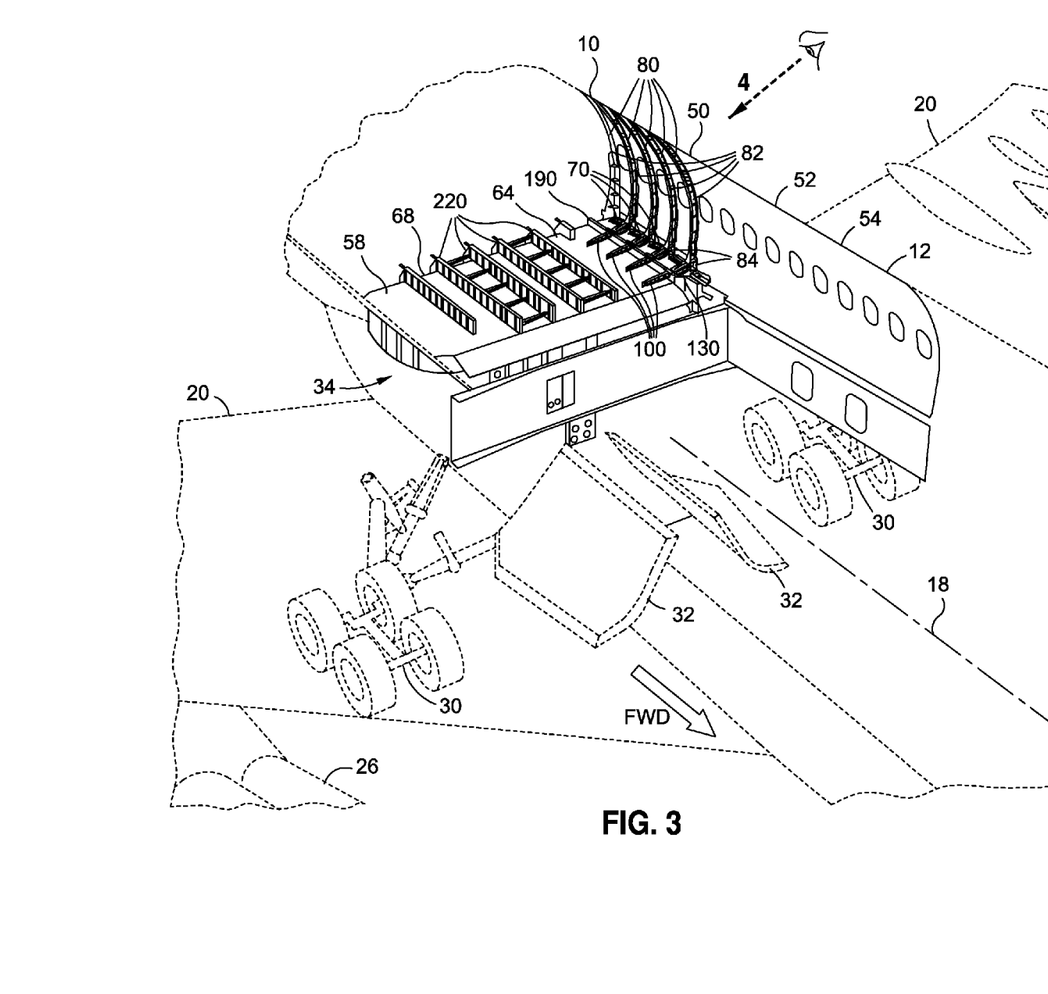
FIG. 3 is a top perspective illustration of the aircraft taken along line 3 of FIG. 1 and illustrating the pressure deck and a plurality of frame members and longitudinal beams for supporting the pressure deck against internal pressurization loads of the aircraft cabin and for supporting a floor panel of the aircraft cabin.

Referring to FIG. 3, shown is a perspective view of the aircraft 10 illustrating the pressure deck 64 supported on one side of the fuselage 12 by the frame members 80. Although not shown, an opposite side of the fuselage 12 may include substantially similar frame members 80 and support structure for supporting the pressure deck 64. The pressure deck 64 is shown supported by a plurality of beam segments 190 and/or a plurality of continuous beams 220 illustrated as being oriented generally parallel to the longitudinal axis 18 of the fuselage 12 and mounted to the pressure deck 64. However, the beam segments 190 and/or the continuous beams 220 may be arranged in any orientation. As was indicated earlier, the pressure deck 64 defines an upper boundary of the wheel well 34 for housing the main landing gear 30 when retracted inside the wheel well 34. One or more of landing gear doors 32 may be closed to seal the main landing gear 30 inside the wheel well 34.

Advantageously, the configuration of the stub frames 84 and intercostals 100 in combination with the longitudinal orientation of the beams 190, 220 allows for an increase in height of the wheel well 34 relative to a conventional arrangement (not shown) of transversely-oriented beams (not shown) for supporting the pressure deck 64. More specifically, the longitudinal orientation of the beams 190, 220 results in an increase in a venting path (not shown) across the pressure deck 64 for cooling and decompression across the pressure deck 64 relative to a reduced vent path provided by a conventional transverse beam arrangement (not shown) for supporting the pressure deck 64. An increased vent path provided by the longitudinal orientation of the beams 190, 220 allows for an increase in the height of the pressure deck while maintaining the same vertical location of the floor panel 66. In addition, the present disclosure advantageously includes adjustable splice fittings 130 for interconnecting the stub frames 84 to the intercostals 100 which results in a significant reduction in assembly time by minimizing or eliminating the need for shimming as required in a conventional transverse beam arrangement for supporting a pressure deck 64. Even further, the incorporation of adjustable splice fittings 130 for interconnecting the stub frames 84 to the intercostals 100 results in a significant reduction in part count including reduced fastener quantity which may translate into a reduction in assembly time and cost.

Figure 4:
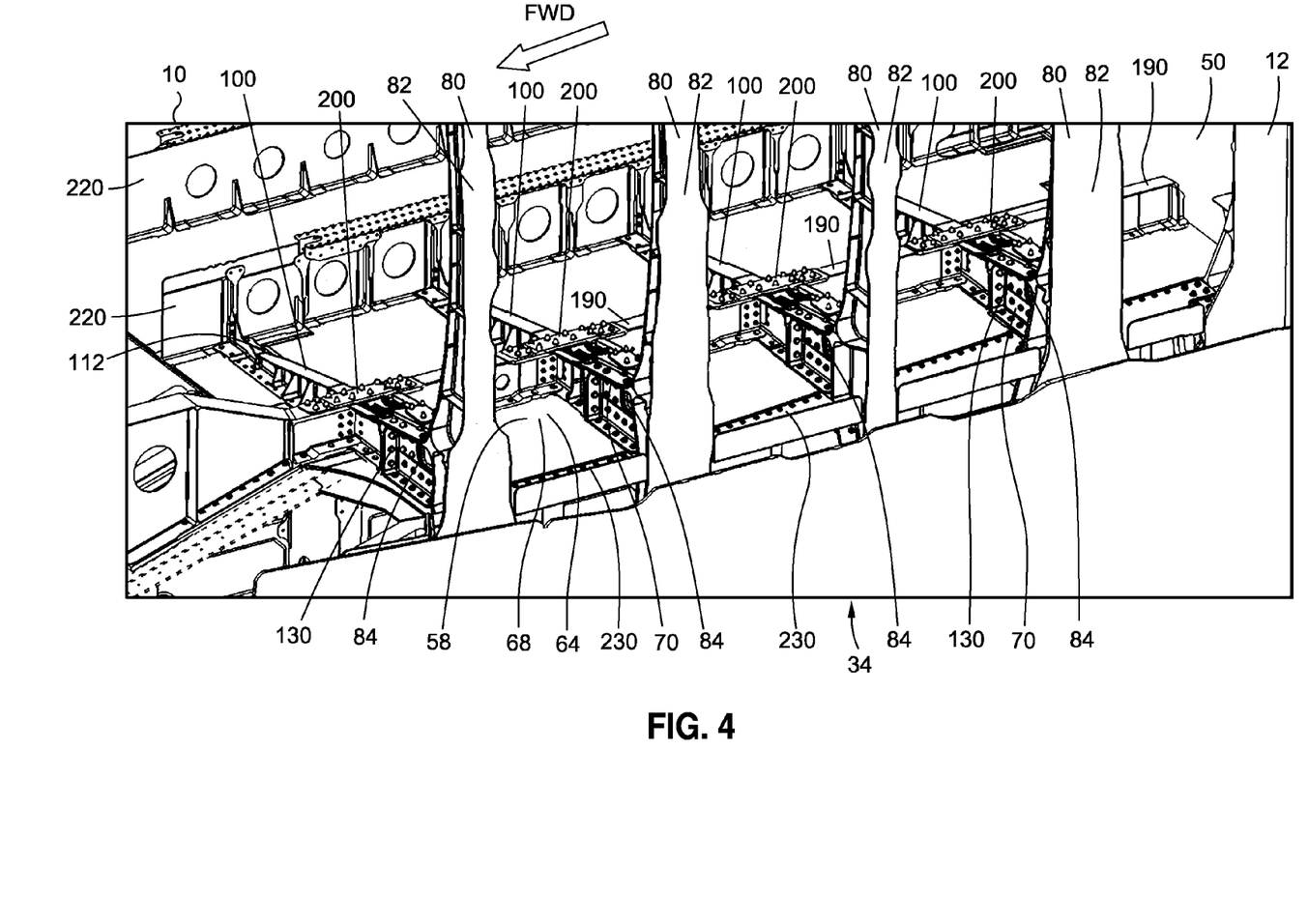
FIG. 4 is a perspective illustration of the fuselage taken along line 4 of FIG. 3 with the fuselage skin removed for clarity and looking inwardly on a plurality of structural joints comprising a plurality of stub frames interconnected to a corresponding plurality of tapered intercostals using a corresponding plurality of adjustable splice fittings.

Referring to FIG. 4, shown is the fuselage 12 with the fuselage skin 52 removed for clarity and illustrating a plurality of the stub frames 84 connected to a corresponding plurality of the intercostals 100 by a plurality of the adjustable splice fittings 130. One or more of the intercostals 100 may be tapered in height along a laterally inward direction. Each intercostal 100 may pass through a pair of longitudinally-oriented beam segments 190 located on opposite sides of the intercostal 100. Each intercostal 100 may terminate at a tapered end 112 which may be coupled to a continuous beam 220 although one or more intercostals may extend through or along one or more of the continuous beams. The continuous beams 220 may be oriented generally parallel to the longitudinal axis 18 of the aircraft although the continuous beams 220 may be oriented in non-parallel relation to the longitudinal axis 18. As indicated above, the continuous beams 220 may extend substantially continuously along a length of the pressure deck 64 as illustrated in FIG. 3. However, one or more of the continuous beams 220 may be provided in two or more beam segments (not shown) arranged end-to-end (not shown).

Figure 5A:
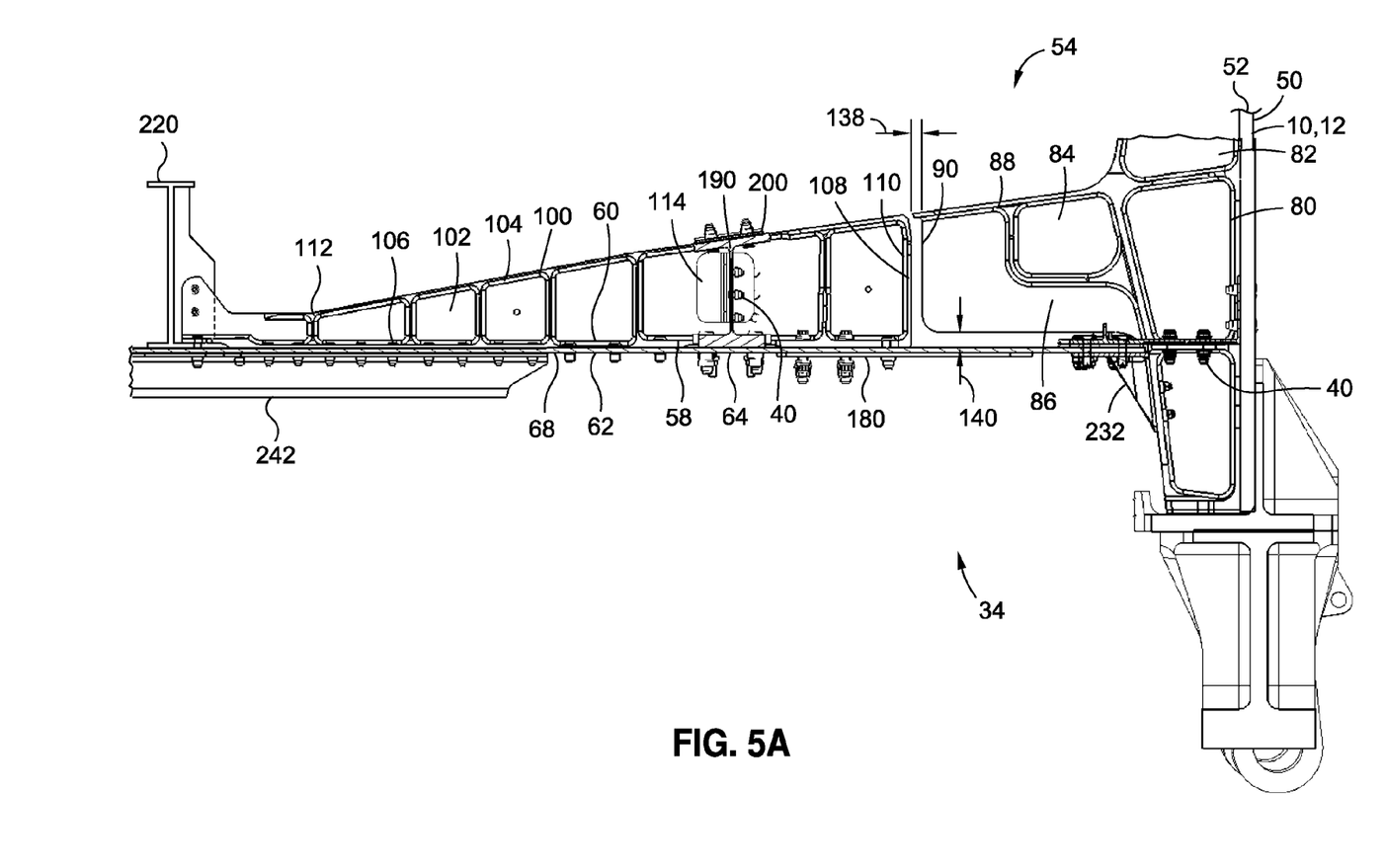
FIG. 5A is a side view of one of the structural joints taken along line 5A of FIG. 2 omitting the adjustable splice fitting and illustrating a spacing between a terminal end of the stub frame and a terminal end of the intercostal.

Each one of the stub frames 84 may have one or more closeout panels 230 located on opposite sides of the stub frame 84. The closeout panels 230 may be mechanically coupled to the stub frame 84 such as by using a support fitting 232 (FIG. 5A). The closeout panels 230 may be mounted to a lateral edge (not shown) of the pressure deck 64. The closeout panels 230 may seal the sides (not shown) of the pressure deck 64 to the fuselage skin 52 (FIG. 5B) as described in greater detail below.

Figure 9:
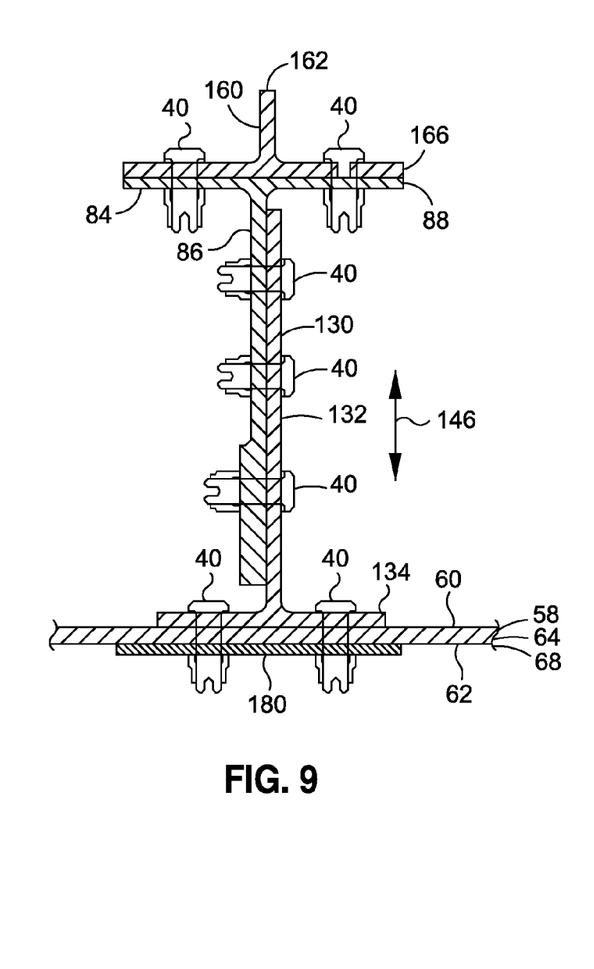
FIG. 9 is a cross-sectional view of the structural joint between the stub frame and the intercostal taken along line 9 of FIG. 5B and illustrating the interconnectivity of the adjustable splice fitting, the stub frame, the upper chord splice fitting, the pressure deck, and a lower chord splice strap.

Referring to FIG. 5A, shown is a side view of one of the stub frames 84 and intercostals 100 mounted in end-to-end relation. The adjustable spice fitting 130 shown in FIG. 4 has been omitted from FIG. 5A to illustrate a spacing 138 between a terminal end 90 of the stub frame 84 and a terminal end 110 of the intercostal 100. FIG. 5A further illustrates a spacing 140 between the lower edge of the stub frame 84 and the upper side 60 of the pressure deck 64. The stub frame 84 includes an upper flange 88 and a web 86 extending over the pressure deck 64 and terminating at the terminal end 90 in spaced relation to a terminal end 110 of the intercostal 100. Advantageously, by omitting a lower flange from the stub frame 84 and by providing the spacing 140 between the stub frame 84 and the upper side 60 of the pressure deck 64, the adjustable splice fitting 130 may attach the stub frame 84 to the pressure deck 64 without the need for shimming due to the adjustable nature of the adjustable splice fitting 130 along a water line 146 direction (i.e., vertical direction) as shown in FIG. 9 and described in greater detail below.

Shown also in FIG. 5A is a beam segment 190 that may be interconnected to the intercostal 100 by means of one or more angle brackets 114 and one/or more beam splice straps 200. As indicated above, each one of the intercostals 100 may include a pair of the beam segments 190 located on opposite sides of the intercostal 100 as shown in FIG. 3. Each one of the beam segments 190 may be mounted to the pressure deck 64 and may be oriented generally parallel to the longitudinal axis 18 of the fuselage 12 although the beam segments 190 may be oriented in any direction that is generally non-parallel with the orientation of the intercostals 100. Each beam segment 190 may include an upper flange 194 and a lower flange 196 interconnected by a web 192. In an embodiment, one or more of the beam segments 190 may have an I-beam cross-sectional shape although the beam segments 190 may be provided in any cross-sectional shape and are not limited to an I-beam shape.

Advantageously, the upper flange 194 of the beam segment 190 may be oriented at an angle substantially similar to the taper angle of the intercostal 100 to facilitate coupling of the upper flanges 194 of the beam segments 190 to the upper flange 104 of the intercostal 100 using a beam splice strap 200 (FIG. 4). The beam splice strap 200 may transfer bending loads from the beam segment 190 on one side of the intercostal 100 to the beam segment 190 on the opposite side of the intercostal 100. The beam splice straps 200 may also stabilize the upper flanges 194 of the beam segments 190 against movement. In this manner, the beam segments 190 and the intercostals 100 may cooperate to support the pressure deck 64 against the internal pressurization load 56 (FIG. 2) and other loads to which the pressure deck 64 may be subjected.

In FIG. 5A, the intercostal 100 may extend from the terminal end 90 of the stub frame 84 toward one of the continuous beams 220. The intercostal 100 may be mounted to the upper side 60 of the pressure deck 64 and may include upper and lower flanges 104, 106 interconnected by a web 102. In an embodiment, the intercostal 100 may have an I-beam cross-sectional shape similar to that which is described above for the beam segments 190. However, any one of the intercostals 100 may be provided in alternative cross-sectional shapes such as a C-shape, a Z-shape, or any one of a variety of other cross-sectional shapes. The intercostal 100 may include an end flange 108 at the terminal end 110 of the intercostal 100 for connection to the terminal end 90 of the stub frame 84.

One or more of the intercostals 100 may be tapered in height along a laterally inward direction to provide a uniform or gradual reduction in stiffness of the intercostal 100 from the terminal end 110 to the tapered end 112. By tapering the intercostals 100 to provide a gradual reduction in stiffness, stress concentrations in the pressure deck 64 may be avoided. Furthermore, by tapering the intercostals 100, the deflected shape (not shown) of the pressure deck 64 may be controlled such that the pressure deck 64 assumes a generally smoothly-curved deflected shape (not shown) under a pressure load (not shown) and/or under other loading conditions. The pressure deck 64 may further include one or more stiffeners 242 that may be mounted to a lower side 62 of the structural member 58 to maintain the bending stiffness of the pressure deck 64 in a transverse direction relative to the longitudinal axis 18. As shown in FIG. 5A, the stiffener 242 may overlap at least a portion of a length of the intercostal 100. Each one of the stiffeners 242 may extend between a corresponding pair of the intercostals 100 mounted on opposite sides of the fuselage 12 as shown in FIG. 4. The stiffeners 242 may be provided in a hat section cross-sectional shape or in any other suitable cross-sectional shape for stiffening the pressure deck 64.

Figure 5B:
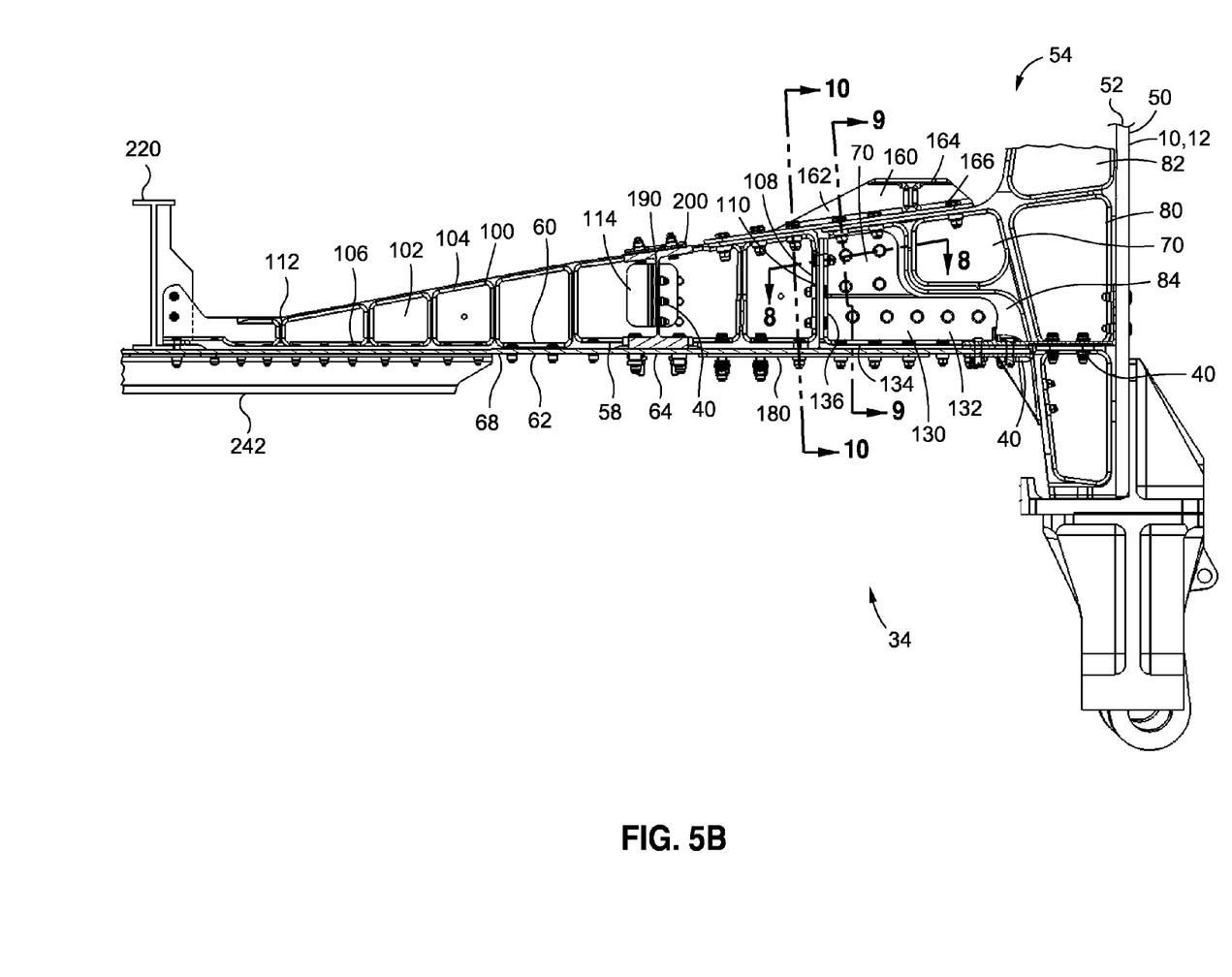
FIG. 5B is a side view of the structural joint of FIG. 5A and illustrating the stub frame connected to the intercostal using the adjustable splice fitting.

Referring to FIG. 5B, shown is an embodiment of one of the adjustable splice fittings 130. Advantageously, the stub frame 84 may be attached to the pressure deck 64 and to the intercostal 100 using a single one of the adjustable splice fittings 130. As indicated above, the adjustable splice fitting 130 may attach the stub frame 84 to the pressure deck 64 and to the intercostal 100 without the need for shimming. In this regard, the adjustable splice fitting 130, the stub frame, and the intercostal 100 are configured to facilitate the ability to adjust the position of the adjustable splice fitting 130 in at least three directions including adjustment along a station 148 direction (i.e., generally parallel to the longitudinal axis 18), a butt line 150 direction (i.e., generally transverse to the longitudinal axis 18), and a water line 146 direction (i.e., generally normal to a plane defined by the station 148 direction and the butt line 150 direction) as described in greater detail below.

Figure 6:
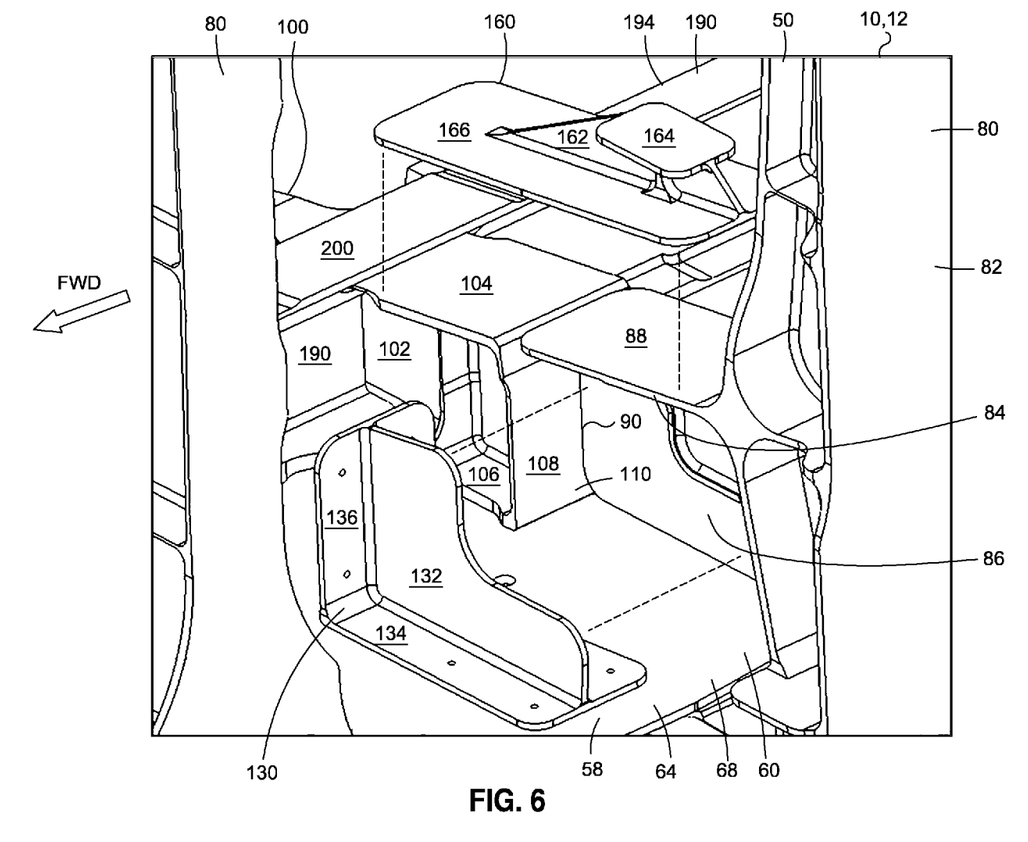
FIG. 6 is a partially exploded perspective illustration of the structural joint illustrating the adjustable splice fitting and an upper chord splice fitting exploded away from the stub frame.
Figure 7:
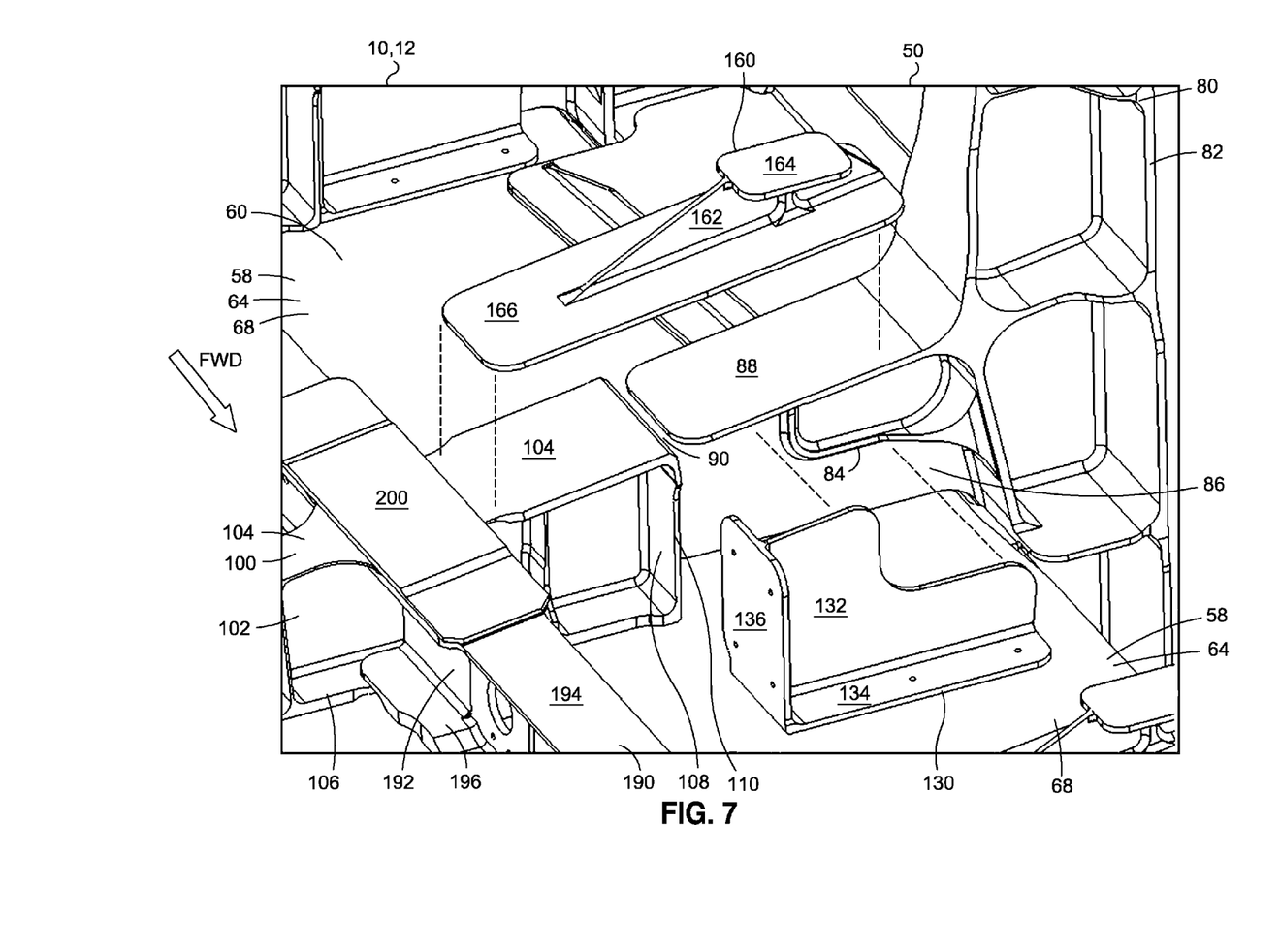
FIG. 7 is a further perspective illustration of the adjustable splice fitting and the upper chord splice fitting exploded away from the stub frame.
Figure 8:
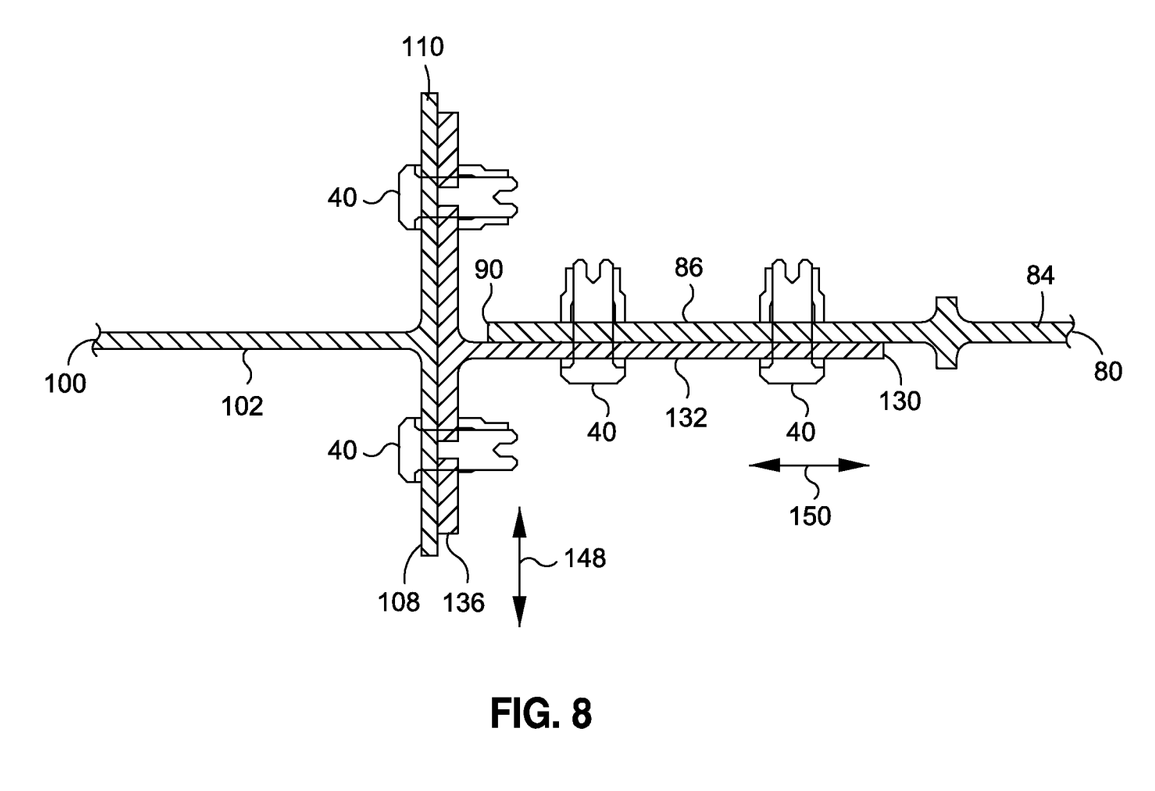
FIG. 8 is a cross-sectional view of a structural joint between the stub frame and the intercostal taken along line 8 of FIG. 5B and illustrating the interconnectivity of the adjustable splice fitting, the stub frame, and the intercostal.

Referring to FIGS. 6-7, shown is the adjustable splice fitting 130 and an upper chord splice fitting 160 exploded away from the stub frame 84. The adjustable splice fitting 130 may include a web 132, a lower flange 134 mounted to or integrated into a lower edge of the web 132, and an end flange 136 mounted to or integrated into a side edge of the web 132. Advantageously, the adjustable splice fitting 130 is devoid of a flange along a top side of the web 132 such that the web 132 of the adjustable splice fitting 130 may be mounted in faying contact or substantially abutting contact with the stub frame 84 web 86 as shown in FIGS. 8-9 and described below. The lower flange 134 of the adjustable splice fitting 130 may be mounted in faying contact or substantially abutting contact with an upper side 62 of the pressure deck 64 as is also shown in FIGS. 8-9 and described below. The end flange 136 of the adjustable splice fitting 130 may be mounted in faying contact or substantially abutting contact with the intercostal 100 end flange 108 as shown in FIGS. 8-9.

The adjustable splice fitting 130 may be mounted to the stub frame 84, the intercostal 100, and the pressure deck 64 using one or more mechanical fasteners 40 as illustrated in FIG. 5B. Once the adjustable splice fitting 130 is attached to the web 86 of the stub frame 84, the lower flange 134 of the adjustable splice fitting 130 may function as a lower chord of the stub frame 84. A desired amount of fasteners 40 web 132 may be used to attach the web 132 of the adjustable splice fitting 130 to the web 86 of the stub frame 84 to ensure that loads in the lower flange 134 of the adjustable splice fitting 130 are transferred between the adjustable splice fitting 130 and the stub frame 84.

Also shown in FIGS. 6-7 is the upper chord splice fitting 160 exploded away from the stub frame 84. The upper chord splice fitting 160 may include upper and lower flanges 164, 166 interconnected by a web 162. The upper flange 164 of the upper chord splice fitting 160 may function as a mounting surface for a seat track fitting (not shown) for supporting a seat track (not shown) in the aircraft cabin 54 (FIG. 2). The lower flange 166 of the upper chord splice fitting 160 may be mounted to the stub frame 84 upper flange 88 and to the intercostal 100 upper flange 104 such as by one or more mechanical fasteners 40 as illustrated in FIG. 5B. When mounted to the upper flanges 88, 104 of the stub frame 84 and the intercostal 100, the lower flange 166 of the upper chord splice fitting 160 may transfer bending loads from the stub frame 84 into the intercostal 100, and vice versa. In this regard, the lower flange 166 of the upper chord splice fitting 160 may function as a load path for transferring compression or tension load between the stub frame 84 upper flange 88 and the intercostal 100 upper flange 104. In addition, the lower flange 166 of the upper chord splice fitting 160 may laterally stabilize the stub frame 84 relative to the intercostal 100.

Referring to FIG. 8, shown is a cross-sectional view of the adjustable splice fitting 130 connecting the stub frame 84 to the intercostal 100. The adjustable splice fitting 130 facilitates mechanical coupling of the stub frame 84 to the intercostal 100 regardless of any misalignment that may exist between the stub frame 84 and the intercostal 100. For example, the adjustable splice fitting 130 facilitates adjustment of the adjustable splice fitting 130 along the butt line 150 direction until the adjustable splice fitting 130 end flange 136 is in substantially abutting contact with a substantially majority of the surface of the intercostal 100 end flange 108. The end flanges 92, 108 of the stub frame 84 and the intercostal 100 may be mechanically fastened together using one or more mechanical fasteners 40. In this regard, the end flanges 92, 108 of the stub frame 84 and the intercostal 100 may accommodate lateral misalignment in the station 148 direction between the stub frame 84 and the intercostal 100. After the end flanges 92, 108 are places in substantially abutting contact with one another, the adjustable splice fitting 130 web 132 may be mechanically fastened to the stub frame 84 web 86.

Referring to FIG. 9, shown is a cross-sectional view of the adjustable splice fitting 130 connecting the stub frame 84 to the pressure deck 64. The adjustable splice fitting 130 may be adjustable along the water line 146 direction (i.e., vertical direction) until the lower flange 134 of the adjustable splice fitting 130 is in substantially abutting contact with the pressure deck 64. In this regard, the adjustable splice fitting 130 may be adjustably positioned along any direction in the plane of the web 132 of the adjustable splice fitting 130 which may facilitate joining the lower flange 134 of the adjustable splice fitting 130 to the pressure deck 64 without the need for shimming therebetween. The lower flange 134 of the adjustable splice fitting 130 may be attached to the pressure deck 64 using one or more mechanical fasteners 40 as shown in FIG. 5B.

FIG. 9 further illustrates a lower chord splice strap 180 that may optionally be applied to the lower side 62 of the pressure deck 64. The lower chord splice strap 180 may overlap the lower flange 134 of the adjustable splice fitting 130 and the lower flange 106 of the intercostal 100 to increase the relative stiffness and strength of the joint therebetween and to transfer load across the joint between the stub frame 84 and the intercostal 100. Alternatively, the lower chord splice strap 180 may be integrated into the pressure deck 64. Also shown in FIG. 9 is the upper chord splice fitting 160 mounted to the stub frame 84 by one or more mechanical fasteners 40 extended through the lower flange 166 of the upper chord splice fitting 160 and the upper flange 88 of the stub frame 84.

Figure 10:
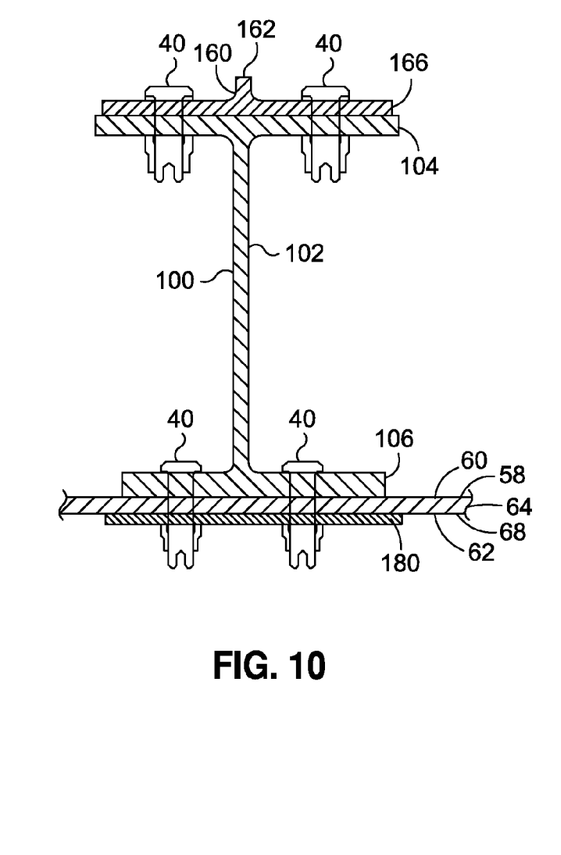
FIG. 10 is a cross-sectional view of the structural joint between the stub frame and the intercostal taken along line 10 of FIG. 5B and illustrating the interconnectivity of the intercostal with the upper chord splice fitting and the pressure deck.

FIG. 10 illustrates the upper chord splice fitting 160 for connecting the upper flange 88 of the stub frame 84 to the upper flange 104 of the intercostal 100. The lower flange 166 of the upper chord splice fitting 160 may act as a load path for transferring compression and/or tension load between the stub frame 84 upper flange 88 and the intercostal 100 upper flange 104. As indicated above, the upper chord splice fitting 160 may laterally stabilize the stub frame 84 against lateral movement relative to the intercostal 100. FIG. 10 additionally illustrates the lower chord splice strap 180 applied to the lower side 62 of the pressure deck 64. As indicated above, the lower chord splice strap 180 may overlap the lower flange 134 of the adjustable splice fitting 130 and the lower flange 106 of the intercostal 100 to increase the relative stiffness thereof. In this manner, the lower chord splice strap 180 may facilitate the transfer of load across the joint between the stub frame 84 and the intercostal 100.

Advantageously, the adjustable splice fitting 130 facilitates adjustment of the stub frame 84 relative to the intercostal 100 and to the pressure deck 64 in at least three directions. The adjustability of the adjustable splice fitting 130 facilitates the placement of the end flange 136 of the adjustable splice fitting 130 in substantially abutting contact with the intercostal 100 end flange 108 regardless of any misalignment between the stub frame 84 and intercostal 100. The adjustable splice fitting 130 also facilitates the placement of the lower flange 134 of the adjustable splice fitting 130 in substantially abutting contact with the pressure deck 64 and obviates mismatch that may otherwise occur if a stub frame were provided with an integral lower flange (not shown) that may be mismatched in height with the pressure deck. In this regard, the adjustable splice fitting 130 may be adjustably positioned along a vertical direction such that the lower flange 134 may be positionable in faying contact with the pressure deck 64 without substantial shimming therebetween. Advantageously, the interconnection of the stub frame 84 to the intercostal 100 and the pressure deck 64 may be performed using only a single adjustable splice fitting 130.

Figure 11:
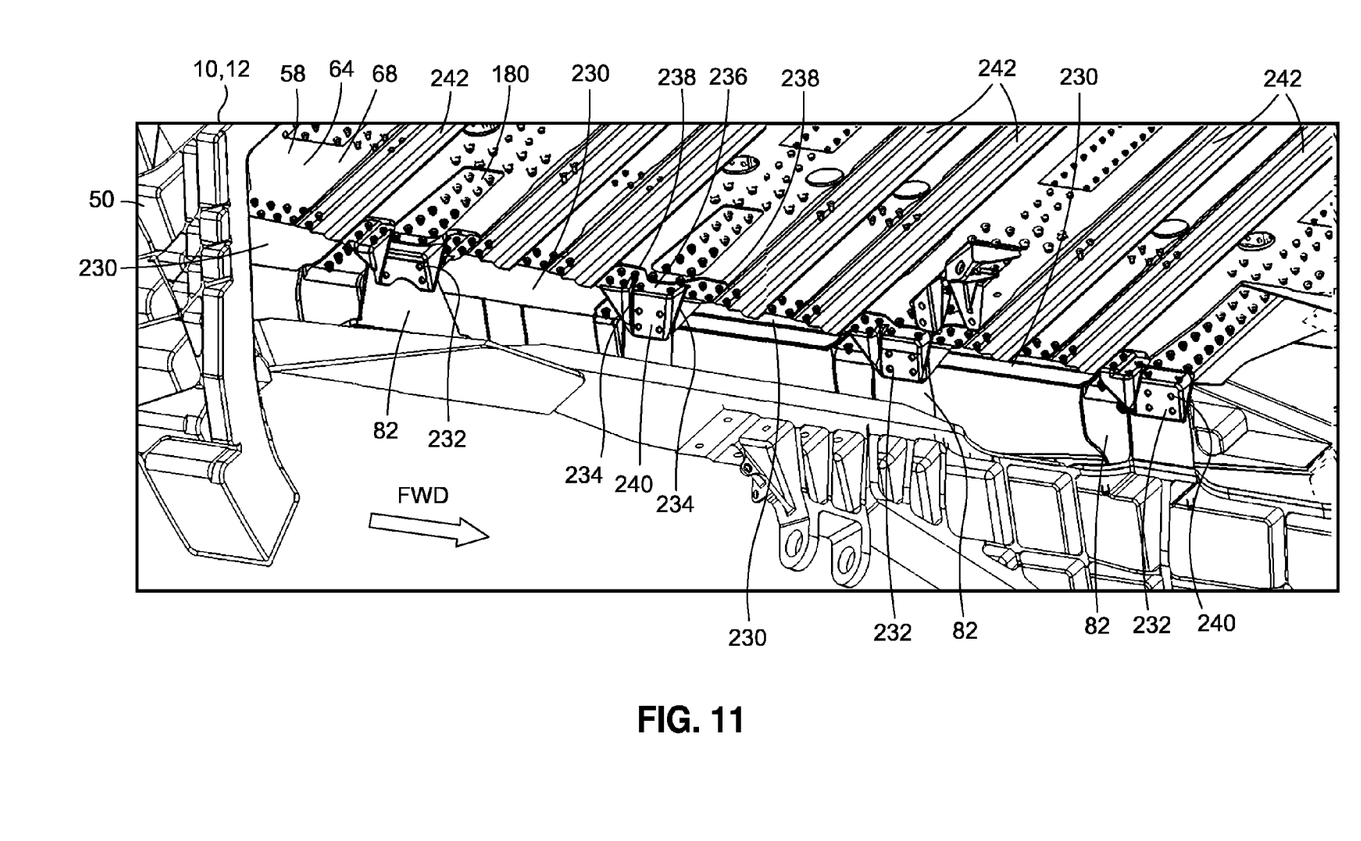
FIG. 11 is a perspective illustration of a lower side of the pressure deck taken along line 11 of FIG. 2 and illustrating a plurality of support fittings mounted to a corresponding plurality of the vertical frames.

Referring to FIG. 11, shown is a lower side 62 of the pressure deck 64 illustrating a plurality of support fittings 232 mounted to a corresponding plurality of the vertical frames 82. Each support fitting 232 may facilitate the coupling of a pair of closeout panels 230 to one of the vertical frames 82. Each one of the support fittings 232 may include an upper flange 236, an end flange 240, and a pair of side flanges 238 on opposite sides of the end flange 240. The support fitting 232 may also include one or more webs 234 extending between the end flange 240 and the upper flange 236 to stiffen the support fitting 232. The end flange 240 may be coupled to the vertical frame 82 using one or more mechanical fasteners.

The upper flange 236 of the support fitting 232 may be coupled to the pressure deck 64 using mechanical fasteners 40. The side flanges 238 may also be coupled to the pressure deck 64 and may additionally be coupled to the closeout panels 230 on opposite sides of the vertical frame 82 by means of mechanical fasteners 40 that may be extended through the side flanges 238, through the pressure deck 64, and into the closeout panels 230 as shown in FIGS. 4 and 10. The support fitting 232 may attach the closeout panels 230 to the vertical frame 82 and may also provide continuity in the stiffness of the pressure deck 64 and the closeout panels 230 across the vertical frame 82. By providing continuity in stiffness of the pressure deck 64 and the closeout panels 230 across the vertical frame 82, resistance of the pressure deck 64 and the closeout panels 230 against the internal pressurization load 56 (FIG. 2) may be improved.

Figure 12:
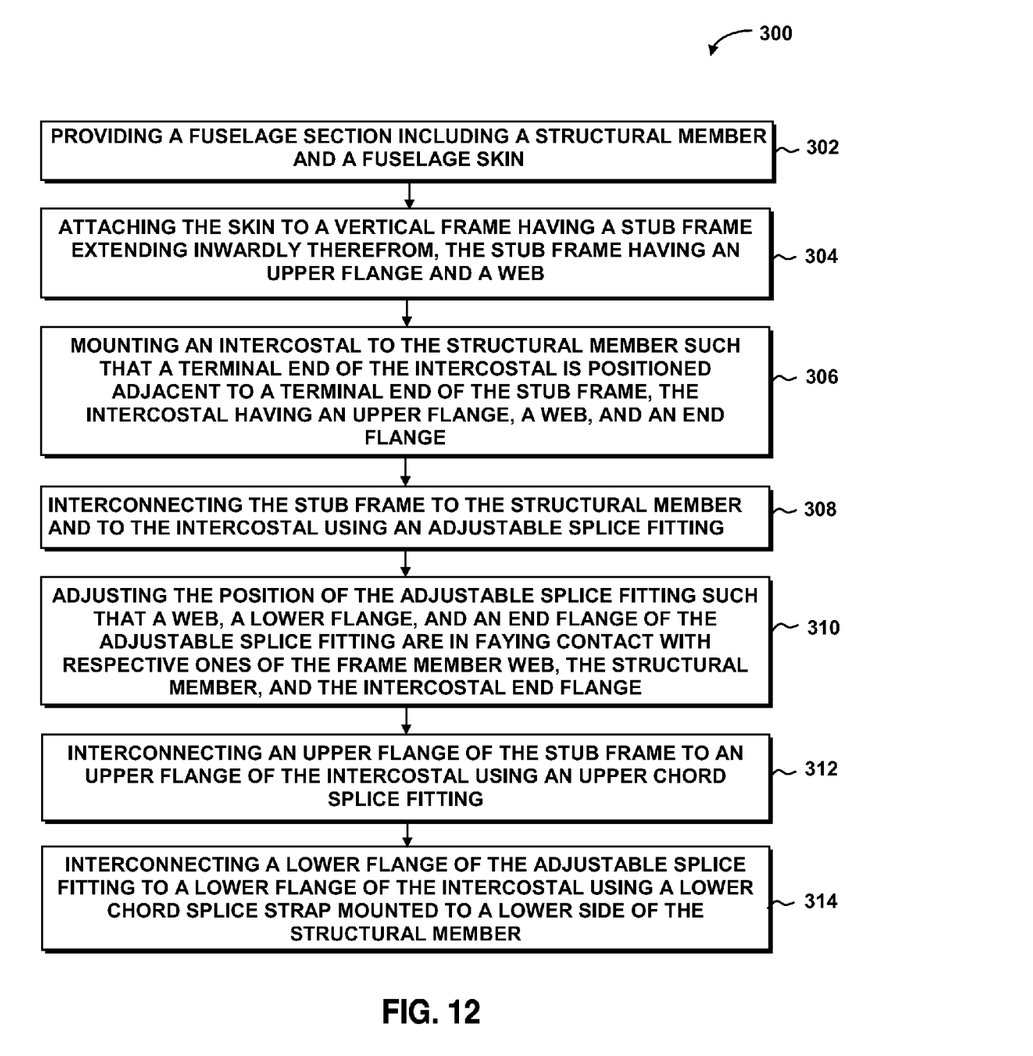
FIG. 12 is an illustration of a flowchart comprising one or more operations that may be included in a method for assembling an aircraft fuselage.

Referring to FIG. 12, shown is a flow chart including one or more operations that may be included in a method 300 for assembling an aircraft 10 fuselage 12 (FIG. 1). Advantageously, the method may include the use of no more than one adjustable splice fitting 130 (FIG. 2) to facilitate the forming of a structural joint 70 (FIG. 2) between two frame members 80 (FIG. 2) without the occurrence of substantial gapping between mating surfaces. In this regard, the method may facilitate the attachment of a stub frame 84 (FIG. 5A) to an intercostal 100 (FIG. 5A) with minimal or no shimming required between faying surfaces. As indicated above, although the use of the adjustable splice fitting 130 (FIG. 5A) to interconnect to frame members 80 (FIG. 5A) is described in the context of an aircraft 10 fuselage 12 for a tube-and-wing aircraft 10, the adjustable splice fitting 130 may be implemented in any one of a variety of structural arrangements where one or more structural elements are interconnected and is not limited to implementation in an aircraft.

Step 302 of the method 300 of FIG. 12 may include providing a fuselage section 50 (FIG. 5A) including a structural member 58 (FIG. 5A) and a fuselage skin 52 (FIG. 5A). As illustrated in FIG. 3, the fuselage skin 52 may be included in a section of the fuselage 12. The structural member 58 may comprise a pressure deck 64 (FIG. 5A) of a wheel well 34 (FIG. 5A). The pressure deck 64 may be subjected to an internal pressurization load 56 (FIG. 2) applied to the aircraft cabin 54 (FIG. 5A).

Step 304 of the method 300 of FIG. 12 may include attaching the fuselage skin 52 to one or more vertical frame 82 as shown in FIG. 5A. Each one of the vertical frames 82 (FIG. 5A) may have a stub frame 84 (FIG. 5A) extending inwardly therefrom. As described above, the stub frame 84 (FIG. 5A) may have an upper flange 88 (FIG. 5A) and a web 86 (FIG. 5A) and may be formed in a T-shaped cross section or in any other suitable cross sections have a web and an upper flange. For example, the stub frame 84 may be formed in an inverted L-shaped cross section.

Step 306 of the method 300 of FIG. 12 may include mounting an intercostal 100 (FIG. 5A) to the pressure deck 64 (FIG. 5A) such that the terminal end 110 (FIG. 5A) of the intercostal 100 is positioned adjacent to the terminal end 90 (FIG. 5A) of the stub frame 84 (FIG. 5A). As shown in FIG. 5A, the intercostal 100 is preferably located such that a spacing 138 exists between the intercostal 100 end flange 108 and the terminal end 90 of the stub frame 84. The intercostal 100 may have an upper flange 104, a web 102, and an end flange 108. The end flange 108 of the intercostal 100 may be located in spaced relation to the terminal end 90 of the stub frame 84.

Step 308 of the method 300 of FIG. 12 may include connecting the stub frame 84 (FIG. 5B) to the pressure deck 64 (FIG. 5B) using the adjustable splice fitting 130 (FIG. 5B). In addition, Step 308 may include connecting the stub frame 84 to the intercostal 100 (FIG. 5B) using the adjustable splice fitting 130. As shown in FIG. 5A, the stub frame 84 and the intercostal 100 are configured to provide a spacing 138 between the terminal ends 90, 110 thereof. The stub frame 84 is also configured to provide a spacing 140 between the stub frame 84 web 86 and the pressure deck 64 to accommodate the adjustable splice fitting 130.

Step 310 of the method 300 of FIG. 12 may include adjusting the position of the adjustable splice fitting 130 (FIG. 7) such that the web 132 (FIG. 7), the lower flange 134 (FIG. 7), and the end flange 136 (FIG. 7) of the adjustable splice fitting 130 are in faying contact with respective ones of the stub frame 84 web 86 (FIG. 7), the pressure deck 64 (FIG. 7), and the intercostal 100 end flange 108 (FIG. 7). As shown in FIG. 8, the adjustable splice fitting 130 end flange 136 of and the intercostal 100 end flange 108 may be placed in substantially abutting contact with one another by adjusting the position of the adjustable splice fitting 130 along a butt line 150 direction. In addition, the adjustable splice fitting 130 may be adjusted in any direction along a plane defined by the interfacing webs 132, 86 of the adjustable splice fitting 130 and the stub frame 84. Mechanical fasteners 40 may be extended through the end flanges 136, 108 of the adjustable splice fitting 130 and the intercostal 100 without substantial need for shimming.

Advantageously, the adjustable splice fitting 130 may accommodate lateral misalignment (i.e., along the butt line 150 direction—FIG. 8), fore-aft misalignment (i.e., along the station 148 direction—FIG. 8), and/or vertical misalignment (i.e., along the water line 146 direction—FIG. 9) between the stub frame 84 and the intercostal 100 and/or pressure deck 64. In this regard, the adjustable splice fitting 130 may facilitate attachment of the stub frame 84 to corresponding ones of the intercostal 100 and to the pressure deck 64 to minimize or eliminate the occurrence of gaps. For example, the adjustable splice fitting 130 may be configured such that gaps of no larger than approximately 0.005 inch may occur between the adjustable splice fitting 130 end flange 136 and the intercostal 100 end flange 108.

Step 312 of the method 300 of FIG. 12 may include interconnecting the upper flange 88 (FIG. 9) of the stub frame 84 (FIG. 9) to the upper flange 104 (FIG. 10) of the intercostal 100 (FIG. 10). For example, FIGS. 6-7 illustrate the upper chord splice fitting 160 which may be mounted to the stub frame 84 upper flange 88 and to the intercostal 100 upper flange 104 as shown in FIGS. 9-10 to facilitate the transfer bending loads between the stub frame 84 and the intercostal 100. The upper chord splice fitting 160 may be mechanically fastened to the stub frame 84 upper flange 88 and the intercostal 100 upper flange 104 as shown in FIGS. 9-10.

Step 314 of the method 300 of FIG. 12 may include interconnecting the lower flange 134 (FIG. 9) of the adjustable splice fitting 130 (FIG. 9) to the lower flange 106 (FIG. 10) of the intercostal 100 (FIG. 10) using the lower chord splice strap 180 (FIG. 10) mounted to the lower side 62 (FIG. 10) of the structural member 58 (FIG. 10). As shown in FIG. 5B, the pressure deck 64 may interconnect the lower flange 134 of the adjustable splice fitting 130 to the lower flange 106 of the intercostal 100. However, the lower chord splice strap 180 may increase the effective thickness of the pressure deck 64 at the location of the lower chord splice strap 180 and may thereby increase the stiffness and strength of the structural joint between the stub frame 84 and the intercostal 100.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A fuselage, comprising:
a fuselage section including a structural member;
a frame member including a stub frame extending over the structural member and having a web;
an intercostal extending from a terminal end of the stub frame and having an end flange; and
an adjustable splice fitting having a web, a lower flange, and an end flange being mountable in faying contact with respective ones of the stub frame web, the structural member, and the intercostal end flange.

2. The fuselage of claim 1 wherein:
the adjustable splice fitting is adjustably positionable in a manner such that the end flange and the lower flange are positionable in substantially faying contact with respective ones of the intercostal end flange and the structural member.

3. The of claim 1 wherein:
the web, the lower flange, and the end flange of the adjustable splice fitting are mechanically fastened to respective ones of the stub frame web, the structural member, and the intercostal end flange.

4. The fuselage of claim 1 wherein the stub frame has an upper flange, the intercostal having an upper flange, the fuselage further comprising:
an upper chord splice fitting interconnecting the upper flange of the stub frame to the upper flange of the intercostal.

5. The fuselage of claim 1 wherein the intercostal has a lower flange, the fuselage further comprising:
a lower chord splice strap mounted to a lower side of the structural member and interconnecting the lower flange of the adjustable splice fitting to the lower flange of the intercostal.

6. The fuselage of claim 1 further including:
at least one continuous beam mounted to the structural member; and
the intercostal terminating at the continuous beam.

7. The fuselage of claim 1 wherein the fuselage has a longitudinal axis, the intercostal has an upper flange, the fuselage further including:
at least one beam segment mounted to the structural member and being oriented generally parallel to the longitudinal axis, the beam segment including an upper flange; and
at least one beam splice strap interconnecting the beam segment upper flange to the intercostal upper flange.

8. The fuselage of claim 1 further including:
a stiffener mounted to a lower side of the structural member and overlapping at least a portion of a length of the intercostal.

9. The fuselage of claim 1 wherein:
the intercostal is generally tapered in height along a laterally inward direction from the stub frame.

10. A fuselage, comprising:
a fuselage section including a structural member and a fuselage skin;
a frame member including a vertical frame and a stub frame, the vertical frame being coupled to the skin, the stub frame extending laterally inwardly from the vertical frame over the structural member and having an upper flange and a web;

an intercostal extending laterally inwardly from the stub frame and being mounted to the structural member, the intercostal having an upper flange, a lower flange, and a web having an end flange; and an adjustable splice fitting interconnecting the stub frame to the structural member and to the intercostal, the adjustable splice fitting having a web, a lower flange, and an end flange being mountable in faying contact with respective ones of the frame member web, the structural member, and the intercostal end flange;

an upper chord splice fitting connecting the upper flange of the stub frame to the intercostal; and a lower chord splice strap mounted to a lower side of the structural member and connecting the lower flange of the adjustable splice fitting to the lower flange of the intercostal.

11. A method of assembling an aircraft, comprising the steps of:

providing a fuselage section including a structural member;

extending a stub frame inwardly over the structural member, the stub frame having a web and a terminal end;

mounting an intercostal to the structural member such that a terminal end of the intercostal is positioned adjacent to the terminal end of the stub frame, the intercostal having an end flange;

interconnecting the stub frame to the structural member and to the intercostal using an adjustable splice fitting having a web, a lower flange, and an end flange; and adjustably positioning the adjustable splice fitting such that the web, the lower flange, and the end flange of the adjustable splice fitting are placed in faying contact with respective ones of the frame member web, the structural member, and the intercostal end flange.

12. The method of claim 11 further comprising the step of:
interconnecting the stub frame to the structural member and to the intercostal using a single one of the adjustable splice fittings.

13. The method of claim 11 further comprising the step of:
adjusting the position of the adjustable splice fitting along the stub frame web in a manner such that the end flange and the lower flange are positioned in substantially faying contact with respective ones of the intercostal end flange and the structural member.

14. The method of claim 11 further comprising the step of:
interconnecting an upper flange of the stub frame to an upper flange of the intercostal using an upper chord splice fitting.

15. The method of claim 11 further comprising the step of:
interconnecting the lower flange of the adjustable splice fitting to a lower flange of the intercostal using a lower chord splice strap mounted to a lower side of the structural member.

16. The method of claim 11 further comprising the steps of:
mounting at least one beam segment to the structural member, the beam segment being oriented in non-parallel relation to the intercostal and including an upper flange; and interconnecting the beam segment upper flange to an upper flange of the intercostal using a beam splice strap.

17. The method of claim 11 wherein the fuselage has a longitudinal axis, the method further comprising the step of:
coupling the intercostal to a continuous beam supporting the structural member.

18. The method of claim 17 further comprising the step of:
orienting the continuous beam generally parallel to a longitudinal axis of the fuselage.

19. The method of claim 11 further comprising the step of:
tapering the intercostal in height along a laterally inward direction from a terminal end of the stub frame.

20. The method of claim 11 further comprising the steps of:
mounting a stiffener to a lower side of the structural member; and overlapping the stiffener with at least a portion of a length of the intercostal.

* * * * *